United States Patent [19]
Harned

[11] 3,717,384
[45] Feb. 20, 1973

[54] ANTI-LOCK BRAKE CONTROL SYSTEM

[75] Inventor: John L. Harned, Grosse Pointe Woods, Mich.

[73] Assignee: General Motors Corporation, Detroit, Mich.

[22] Filed: March 15, 1971

[21] Appl. No.: 124,336

[52] U.S. Cl..............303/21 BE, 188/181 A, 303/20, 303/21 P
[51] Int. Cl. ................................................B60t 8/12
[58] Field of Search ...188/181; 303/20, 21; 324/162; 340/52 R, 262

[56] References Cited

UNITED STATES PATENTS

| | | | |
|---|---|---|---|
| 3,604,761 | 9/1971 | Okamoto et al. | 303/21 BE X |
| 3,604,762 | 9/1971 | Ando et al. | 303/21 BE |
| 3,606,490 | 9/1971 | Ando | 303/21 BE |
| 3,578,819 | 5/1971 | Atkins | 303/21 P |
| 3,499,689 | 3/1970 | Carp et al. | 303/21 P |
| 3,544,172 | 1/1970 | Howard et al. | 303/21 BE |
| 3,545,819 | 12/1970 | Gaffney et al. | 303/21 R |

*Primary Examiner*—Trygve M. Blix
*Assistant Examiner*—Stephen G. Kunin
*Attorney*—Jean L. Carpenter, Paul Fitzpatrick and Warren D. Hill

[57] ABSTRACT

An electronic control for an anti-lock brake control system provides different deceleration threshold reference signal levels for high and low coefficient surfaces. A coefficient select circuit is responsive to wheel acceleration during the period of wheel speed recovery in an anti-lock cycle and selects for use during the subsequent cycle one of the threshold values in accordance with the degree of wheel acceleration. Another circuit senses wheel hop during braking to further increase the threshold during wheel hop to desensitize the control to undesirable transients.

6 Claims, 4 Drawing Figures

INVENTOR.
John L. Harned
BY
Warren D. Hill
ATTORNEY

ANTI-LOCK BRAKE CONTROL SYSTEM

This invention relates to anti-lock brake control systems and in particular to such a system which is adapted to the coefficient of friction between the braked wheel and the road surface.

It has previously been proposed as in the patent application of John L. Harned, Ser. No. 754,252, now U.S. Pat. No. 3,554,612 to provide an anti-lock brake control which senses incipient lock-up by comparing the deceleration of a braked wheel with a predetermined reference deceleration. In such systems it is necessary to select a reference deceleration which is suitable for all vehicle operating conditions. However, a deceleration reference which is optimum for a dry road having a high coefficient of friction is not usually the best value for use on an icy road having a low coefficient of friction. It is therefore desirable to provide a reference deceleration which varies according to the coefficient of friction between the braked wheel and the road surface. It has been found that the value of acceleration of a braked wheel during the wheel speed recovery phase when the brake pressure has been relieved can be used as a measure of the coefficient of friction and that the deceleration reference may be varied according to that acceleration to provide an anti-lock brake control system adaptive to road conditions.

It is therefore a general object of the invention to provide an anti-lock brake control having a reference signal variable in accordance with wheel acceleration of a previous anti-lock brake control cycle.

A further object of the invention is to provide an anti-lock brake control system having high and low deceleration reference thresholds and a circuit for selecting the appropriate threshold according to the coefficient of friction of the road surface.

Another object is to provide an anti-lock brake control having a circuit for sensing transient wheel hop signals and momentarily increasing the deceleration reference threshold to suppress their effect.

The invention is carried out by providing a circuit responsive to rotation of a braked wheel for sensing incipient wheel lock-up and cyclically relieving and reapplying brake pressure to prevent wheel lock-up wherein a deceleration threshold signal has a value predicated on a measure of wheel deceleration during a previous brake release period. In particular, the invention contemplates that a high deceleration threshold reference will be applied when the braked wheel experiences a high acceleration during the previous release cycle and a low threshold when the wheel experiences a low acceleration during the previous cycle.

The invention is further carried out by providing a control circuit responsive to braked wheel acceleration for sensing incipient wheel lock-up and including a circuit for sensing transient wheel hop acceleration signals and for increasing the deceleration reference threshold to render the control circuit less sensitive to the wheel hop signals.

The above and other advantages will be made more apparent from the following specification taken in conjunction with the accompanying drawings wherein like reference numerals refer to like parts and wherein.

The system in which this invention is utilized follows the well established principle of sensing incipient wheel lock-up when brake pressure is applied to vehicle brakes, then relieving the brake pressure until the wheel accelerates enough to be out of danger of locking and then reapplying the brake pressure. This cycle is repeated as necessary to achieve the desired braking action. This system is particularly well adapted to practice the control principle of the extremal type in which brake pressure sufficient to cause a substantially increased wheel slip is released to permit wheel acceleration and consequent decreasing wheel slip. The brake pressure is then controlled to permit wheel acceleration and therefore a decrease in wheel slip while maintaining a brake torque on the wheel until the wheel acceleration ceases. The brake apply pressure then again is increased to cause wheel deceleration. This extremal type of control is more fully set forth in the U.S. Pat. No. 3,441,320 to D. M. Flory.

The system further employs an improved version of the Inertia Wheel Velocity Reference Principle which is fully set forth in the aforesaid Ser. No. 754,252. Stated briefly, the principle involves measuring the velocity of a braked wheel and subtracting therefrom a simulated vehicle velocity (or "optimum wheel velocity") and utilizing the difference as a criterion of when the wheel brake should be released and reapplied for most effective control.

Figure 1:
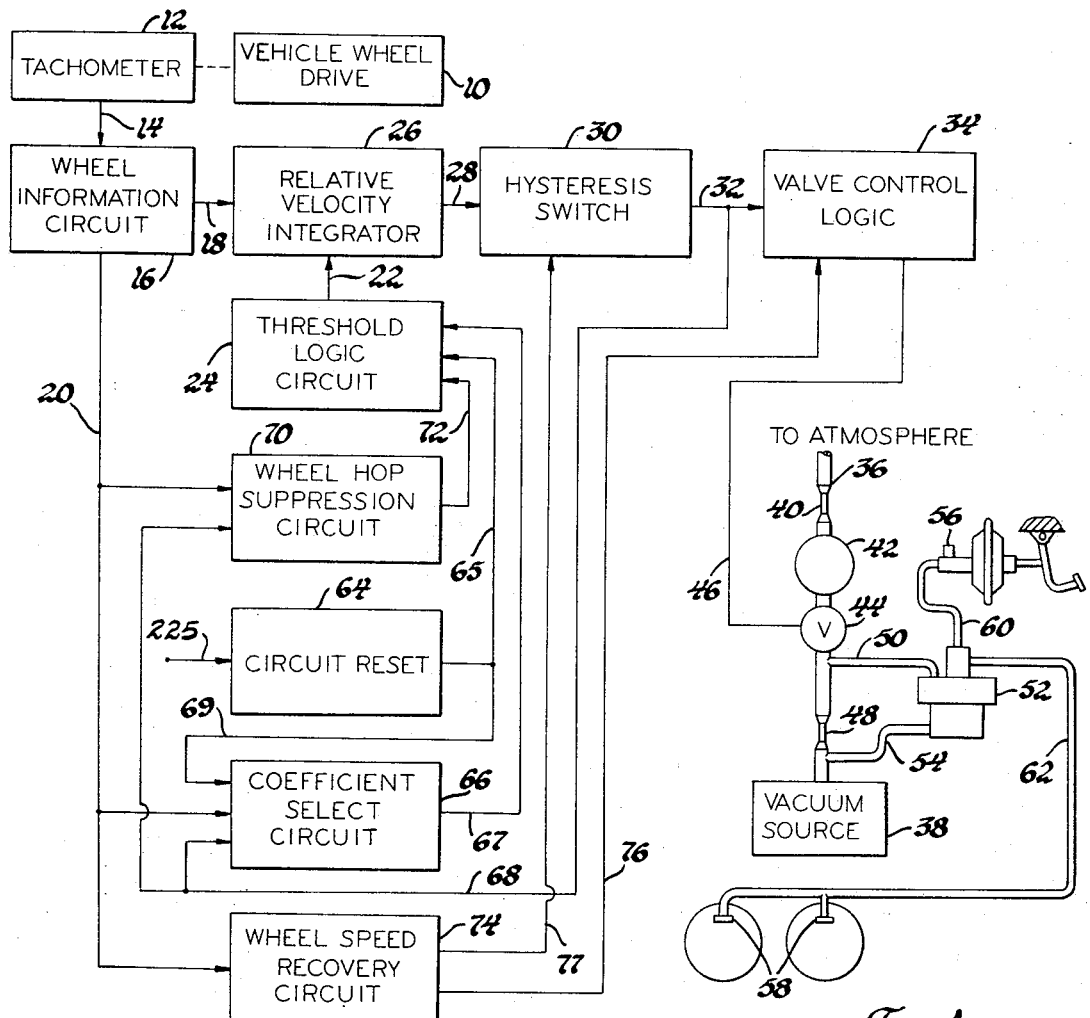
FIG. 1 is a block diagram of an anti-lock brake control system coupled with a schematic diagram of a hydraulic brake system with a brake pressure modulator according to the invention.

Referring to FIG. 1 for a further description of the system, a vehicle wheel drive 10 is provided as an information source for the system. The vehicle wheel drive 10 may be a wheel per se, a propeller shaft driving a plurality of wheels or any other vehicle member having a velocity or rotation proportional to wheel velocity. A tachometer 12 such as a well-known toothed wheel variable reluctance electromagnetic transducer is driven by the wheel drive 10 and provides an alternating signal having a frequency proportional to the wheel speed on line 14 and leading to a wheel information circuit 16. The wheel information circuit prepares a DC voltage or current proportional to wheel acceleration on lines 18 and 20. The wheel acceleration signal on line 18 is compared with an appropriate threshold signal on line 22 which is prepared by a threshold logic circuit 24 and the difference between the signals is integrated by a relative velocity integrator 26 to produce a relative velocity error signal on line 28, which signal is utilized by a hysteresis switch 30 to signal via line 32 a valve control logic circuit 34 to release brake pressure.

A brake pressure modulating system comprises a combination pneumatic and hydraulic system. The pneumatic portion comprises a tube 36 vented to atmosphere at one end and connected at the other end to a vacuum source 38 which may be the vehicle engine manifold. The tube 36 contains in series a restricting orifice 40 near the vent to atmosphere, a pressure accumulator 42, a normally closed electrically operated release valve 44 controlled by an output signal on the conductor 46 from the valve control logic circuit 34, and a second restricting orifice 48. A branch tube 50 is connected to the tube 36 at a point between the valve 44 and the orifice 48 and leads to a pressure modulator 52. Another pneumatic tube 54 connects the modulator 52 with the vacuum source 38. The hydraulic portion of the system includes a manually operated conventional master cylinder 56 for applying brake pressure to conventional vehicle brakes 58 through a first supply line 60 to modulator 52 and a second supply line 62. The structure and operation of the modulator 34 is fully described in the above-mentioned Flory patent and no further description herein is necessary except to point out its function.

Normally, with valve 44 closed, vacuum pressure from the source 38 is applied through the tubes 50 and 54 to both sides of the modulator 52 and in this condition, the modulator transfers the brake pressure from the master cylinder 56 to the brakes 58 without any modulation. However, when the valve 44 is opened to supply air pressure from the atmosphere to the modulator 52 through the tubes 36 and 50, the modulator will first isolate the brakes 58 from the master cylinder 56 and will then relieve pressure from the brakes 58 to a degree determined by the amount of air pressure supplied through the tube 50. The function of the accumulator 42 is to permit a rapid release of brake pressure for a short time after the valve 44 is opened. Thereafter brake pressure will decrease more slowly as determined by the flow of air through the orifice 40. When the valve 44 is closed, the brake pressure increases toward master cylinder pressure at a controlled rate determined by the air flow through the orifice 48.

The threshold logic circuit 24 senses the operating characteristics of the system and selects the appropriate threshold to be biased against the incoming wheel deceleration signal. Before brake pedal application, the circuit reset 64 signals on line 65 a 12g threshold. This masks any random noise signal from momentarily triggering the anti-lock control, for example, when controlled wheels have been overspeed during vehicle acceleration. The remaining thresholds are applied depending on operating mode, road surface coefficient, and impending wheel hop during rough road operation.

The coefficient select circuit 66 senses the wheel acceleration signal on line 20 to determine whether the wheel speed recovers in excess of 4g's. If it does, then a 2g threshold is applied via line 67 to the threshold logic circuit 24 during the next brake apply cycle. Otherwise, a 1g rate is selected. The 4g wheel speed recovery rate discriminates between most road surfaces and the very slippery icy surfaces which require a lower threshold for proper operation. The coefficient select circuit 66 also senses the operation of the hysteresis switch 30 via the line 68 to reset the 1g threshold whenever the hysteresis switch calls for a brake release. The coefficient select circuit 66 is also actuated by the circuit reset 64 via line 69 to further increase the threshold when the brake pedal is not actuated.

A wheel hop suppression circuit 70 senses wheel accelerations in the wheel hop frequency range by filtering the acceleration signal on line 20 with a bandpass filter. When this circuit senses an acceleration of 2g's or more at the wheel hop frequency, then it signals the threshold logic circuit 24 via line 72 to apply an additional threshold of 1.5g's during the brake apply mode. The hysteresis switch also unlocks the wheel hop suppression circuit 70 via line 68 to insure that the 1.5g threshold is off during release. No more than 1g is applied to the relative velocity integrator 26 during release.

The wheel speed recovery circuit 74 is responsive to the acceleration signal and provides the operating sense to appropriately control the valve control logic 34 via the line 76 during the wheel speed recovery phase of the cycle, which controls the hold mode and the 2g apply technique. The 2g apply technique allows brake pressure to be reapplied during wheel speed recovery whenever the acceleration of the wheel exceeds approximately 2g's. The wheel speed recovery circuit also disables the hysteresis switch 30 via line 77 to prevent brake application when the wheel acceleration exceeds 0.5g.

Figure 2:
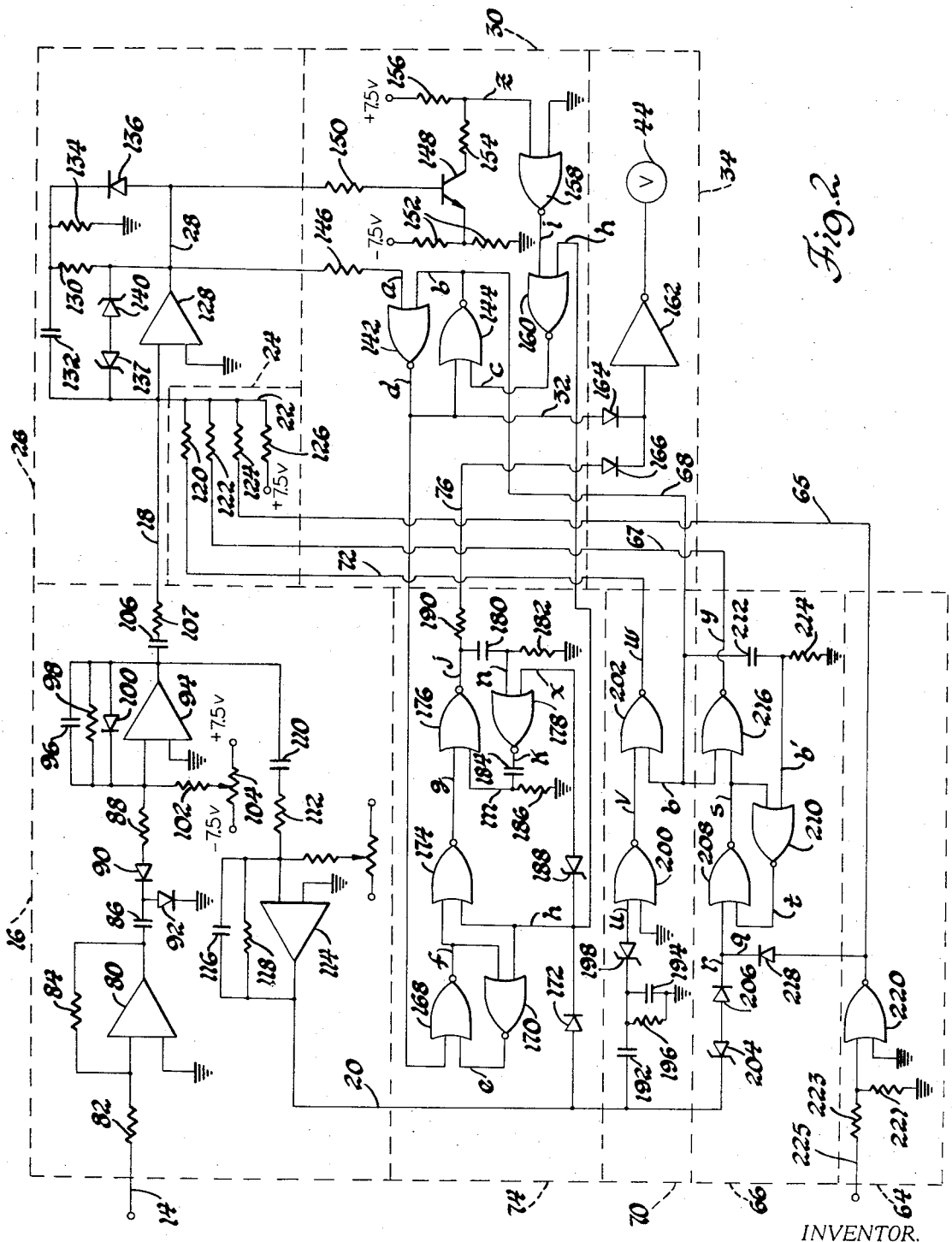
FIG. 2 is a schematic diagram of the control circuit of FIG. 1 according to the invention.

FIG. 2 illustrates the details of the control circuit.

Wheel Information Circuit

The wheel information circuit 16 has as an input from the tachometer 12 on line 14 a train of pulses having a frequency proportional to the sensed wheel speed. The pulses are fed into a high gain squaring amplifier 80 having an input resistor 82 and a feedback resistor 84 to produce an output train of square pulses with constant amplitude and edge slope. A differentiator comprises a capacitor 86, a resistor 88 and a diode 90 in series with the output of the amplifier 80 and a diode 92 between the capacitor 86 and ground, and produces a negative pulse of constant area for every square pulse input. The duration of the pulse is less than the period of the input pulses at maximum vehicle speed. This prevents an overlap of pulses which would introduce non-linearities. The negative pulses from the differentiator are then filtered by an active first order low pass filter which comprises an operational amplifier 94 having a feedback capacitor 96 and a feedback resistor 98. A feedback diode 100 in conjunction with a biasing voltage divider network including resistors 102 and 104, sets a low speed threshold that must be overcome by the negative pulses before a positive voltage will appear at the output of the amplifier 94. This provides a low speed cutout feature for the circuit. The resistor 104 is connected at opposite ends to a −7.5v and +7.5v DC power supply. The output of the amplifier 94 is a positive voltage proportional to wheel speed. This voltage is then differentiated by two circuits. The first is a non-inverting passive differentiator comprising a series connected capacitor 106 and resistor 107 which produces a current on line 18 proportional to wheel acceleration. The second differentiator is also a passive differentiator comprising capacitor 110 and a resistor 112 serially connected between the output of the amplifier 94 and the input of a non-inverting operational amplifier 114. A low pass filter comprises feedback capacitor 116 and feedback resistor 118 across the amplifier 114 to smooth out the ripple.

Threshold Logic Circuit

The threshold logic circuit 24 includes an array of input resistors 120, 122, 124 and 126, each having one end connected to the common line 22. The other ends of the resistors are connected to the outputs of the wheel hop suppression circuit 70, the coefficient select circuit 66, the circuit reset 64 and the +7.5v DC power supply respectively. The resistor values are chosen to provide threshold bias currents to line 22 according to the desired circuit functions as recited above. The resistor 126 provides the minimum deceleration threshold of 1g. The other thresholds when applied are additive and will increase the threshold according to their respective values.

Relative Velocity Integrator

The relative velocity integrator circuit 26 senses the wheel acceleration signal on line 18 and the threshold bias on line 22. The integrator includes an operational amplifier 128 having a feedback circuit including a gain resistor 130 in series with an integrating capacitor 132, a resistor 134 between ground and the junction of the resistor 130 and capacitor 132, and a diode 136 across the resistor 130. These components give the amplifier a dual integration gain. A high gain exists when the amplifier output is negative and the diode 136 is blocking. However, as the amplifier output moves into its positive range, the diode 136 conducts to shunt the gain resistor 130 to lower the gain. This feature offers a sensitive range for triggering system switch points for control purposes and a lower gain range for storing excessive relative wheel speed buildup. A pair of oppositely poled Zener diodes 137 and 140 are serially connected across the amplifier 128 to limit the amplifier's output short of its saturation values. In operation, when the system is not controlling, that is, when the current on line 18 flowing from the amplifier 128 does not exceed the threshold current on line 22, the output of the amplifier 128 is slightly above negative saturation. As the wheel deceleration increases to a value exceeding the threshold, then the output of the amplifier 128 increases, i.e., becomes less negative to signify the velocity error or the difference between the wheel velocity and the simulated vehicle velocity.

Hysteresis Switch

The hysteresis switch 30 is operated by the output of the relative velocity integrator 26. This switch includes logic NOR gates as does much of the remainder of the circuit to be described. The gates switch at, say, 0.7v, so that when both inputs to a NOR gate are low (below 0.7v), then the gate output must be high (above 0.7v). If either or both inputs to a NOR gate are high, then the output will be low. NOR gates 142 and 144 are connected to form a set-reset flip-flop. The flip-flops' inputs $a$ and $c$ respond to different relative velocity output levels of the amplifier 128. Input $a$ to NOR gate 142 is connected through a resistor 146 to the output of the amplifier 128 on line 28. An NPN transistor 148 has its base connected through a resistor 150 to the line 28 and its emitter is connected to the midpoint of a voltage divider comprising resistors 152 connected between a −7.5v DC source and ground. The collector is connected through series resistors 154 and 156 to +7.5v. The junction point of resistors 154 and 156 form an input $z$ to a NOR gate 158 which has its other input grounded and therefore acts simply as an inverter. The output of the gate 158 comprises an input $i$ to a NOR gate 160 which has its other input signal $h$ from the wheel speed recovery circuit 74. The output of the NOR gate 160 forms the input $c$ to the NOR gate 144 while the other input of the NOR gate 144 is the signal $d$ from the output of the NOR gate 142. To complete the flip-flop circuit, the output of the NOR gate 144 comprises an input $b$ of NOR gate 142. Initially, when the voltage on line 28 is negative, transistor 148 is off and input $c$ to gate 144 is high, assuming that the input $h$ to gate 160 is low, as it will be during periods of wheel deceleration. Thus signal $b$ will be low and, since input $a$ is also low, signal $d$ will be high. Circuit values are so selected that when a velocity error of one-half ft. per second is accumulated by the relative velocity integrator, the transistor 148 starts to conduct so that signal $z$ goes low, signal $i$ goes high and signal $c$ goes low. However, since signal $d$ is high, the gate 144 will not change state until input $a$ turns high. Input $a$ remains low until 4 ft. per second velocity error has been accumulated by the relative velocity integrator, at which time the line 28 becomes positive and input $a$ will turn high. This switches signal $d$ low which allows $b$ to turn high. The flip-flop thus changes state and will not change back until the voltage on line 28 returns to the one-half ft. per second switch point that turns off transistor 148 to switch input $c$ to high. Thus, the hysteresis switch's output $d$ remains high until a 4 ft. per second relative velocity is reached, then it switches low until the velocity error diminishes to less than one-half ft. per second. Even then the output $d$ will remain low until the signal $h$ goes low whereupon $d$ switches high. The output $d$ is connected via line 32 to the valve control logic 34.

Valve Control Logic

The valve control logic 34 consists of a buffer amplifier 162 which is an inverting current amplifier having a single input supplied by a diode 164 connected to signal $d$ on the line 32 and by a diode 166 connected with a signal $j$ on line 76 from the wheel speed recovery circuit. If both inputs $d$ and $j$ are low, then the amplifier 162 will be turned on to energize the normally closed solenoid valve 44 and release brake pressure. If, however, either the input $d$ or $j$ is turned high, then the amplifier 162 will be turned off to close the solenoid valve. The circuits described to this point relative to FIG. 2 are sufficient to control a basic anti-lock system. However, to insure satisfactory system performance under virtually all possible operating conditions, the remaining circuits including the wheel speed recovery circuit 74, the wheel hop suppression circuit 70, the coefficient select circuit 66, and the circuit reset 64 are employed.

Wheel Speed Recovery Circuit

The wheel speed recovery circuit 74 accomplishes two objectives: (1) It reduces the complexity and cost of the hydraulic modulator by making a hold mode solenoid valve unnecessary and, (2) it reduces the total response characteristics necessary for good anti-lock control performance by instituting brake apply during the wheel speed recovery when the wheel accelerates in excess of 2g's. The wheel recovery logic circuit eliminates the need for a separate hold valve by replacing its function with a rapid switching of the release valve 44 between release and apply to modulate a nearly constant brake pressure.

NOR gates 168 and 170 are connected as a set-reset flip-flop circuit which constitutes a hold switch. Signal $d$ from the hysteresis circuit forms the reset input and is applied to gate 168. Input $h$ is applied to the gate 170 for the set input and is produced by a voltage level detector comprising a diode 172 connected between the line 20 and the input $h$ so that when the positive acceleration signal is below 0.5g, the diode 172 does not conduct and the input $h$ is low. However, when the acceleration exceeds that value, $h$ becomes high. The output $f$ of the flip-flop circuit and the input $h$ comprise inputs to a NOR gate 174. The output $g$ of the gate 174 provides an input to a multivibrator which includes NOR gates 176 and 178. The output $j$ of gate 176 is connected through a capacitor 180 to an input n of the gate 178. The input $n$ is also connected to ground through a resistor 182. Similarly, the output $k$ of the gate 178 is connected through a capacitor 184 to an input $m$ of the gate 176, which input is also connected to ground through a resistor 186. The other input $x$ of the gate 178 is connected through a Zener diode 188 to the diode 172. The Zener diode is selected to break down at 1.5g's so that it acts as a second voltage level detector. Thus, when wheel acceleration exceeds 2g's, the voltage on line 20 will be sufficient to cause both the diode 172 and the Zener diode 188 to conduct to switch the input $x$ to a high level, whereas at lower values of acceleration, the Zener diode 188 will not conduct and the input $x$ will be at a low level. The output $j$ of the gate 176 is connected through an output resistor 190 to the line 76.

The multivibrator has three operating modes. When the input $g$ is high, the output $j$ is low to enable a brake release if the signal d is also low. When the input $g$ is low, and the input $x$ is high, thereby holding the signal $m$ low, then the output $j$ is high causing a brake pressure application. When, however, the input $g$ is low, and the input $x$ is also low, then the multivibrator will serve as an oscillator supplying rapidly alternating high and low pulses. The oscillation mode is a result of pulse decay timing by the capacitors 180 and 184 and resistors 182 and 186. Since m is normally low and $g$ is low, output $j$ will be high turning signal $n$ high momentarily. As the charge on the capacitor 180 decays, n will become low and signal $k$ will switch high to momentarily turn the signal m high which in turn turns the output $j$ low until the capacitor 186 discharges and $m$ turns to its low level causing $j$ to switch high again to cause repetition of the cycle.

In operation of the wheel speed recovery circuit, prior to brake release, the signal $d$ is high causing the signal $f$ to be low. Since the input $h$ must be low during brake application and wheel deceleration, then the signal $e$ is high. Since the signals $f$ and $h$ are low, then the signal $g$ will be high and the signal $j$ will be low to thereby permit brake release when signal $d$ is switched low by the hysteresis switch. However, at brake release when $d$ goes low, the flip-flop circuit does not change state since the signal $e$ is high and $f$ remains low. When, however, after brake release the wheel accelerates to a value above 0.5g's, the signal $h$ goes high to cause $g$ to go low, causing $j$ to oscillate to automatically turn the valve 44 on and off to hold the brake pressure at a relatively constant value. When, however, the acceleration signal on line 20 exceeds 2g's, the input $x$ goes high causing the output $j$ to stay high to effect brake application. Should the wheel acceleration then drop below 2g's, the input $x$ will drop to a low level and the output $j$ will return to its oscillating hold condition. When the wheel recovers sufficient speed that the velocity error drops to one-half ft. per second, the transistor 148 in the hysteresis switch turns off so that signal $z$ at gate 158 goes high and its output $i$ goes low. However, if the wheel is still accelerating above a value of 0.5g, the signal $h$ will still be high and the signal $c$ will remain low so that the flip-flop 142,144 does not change state and the signal $d$ remains low whereby the wheel speed recovery circuit is the controlling agent. When, however, the wheel acceleration drops below a 0.5g and signal $h$ goes low, signal $c$ will g high permitting signal $d$ to go high to close the valve 44 and reapply the brakes.

Wheel Hop Suppression Circuit

On rough roads the vehicle suspension system is excited at its wheel hop frequency of about 10 Hz and large wheel acceleration amplitudes are generated, particularly during braking. These large acceleration excursions may cause premature system operation which releases brake pressure to assume a value below that called for by the driver or below that allowed by the road surface coefficient friction value for maximum vehicle deceleration. The wheel hop suppression circuit 70 senses the transient signals caused by the wheel hop and renders the system less sensitive to such signals by increasing the acceleration threshold by an additional 1.5g. The circuit includes a bandpass filter comprising capacitors 192 and 194 and a resistor 196 connected to line 20 to sense acceleration signals. The filter passes those signals having frequency in the range of 10 Hz. A Zener diode 198 in series with the filter is selected to conduct those signals in excess of 2g to provide an input $u$ to a NOR gate 200 having its other input grounded. The output $v$ of the NOR gate 200 provides an input to a NOR gate 202 having an output $w$ on line 72. The second input to the NOR gate 202 is the signal $b$ from the hysteresis switch 30. Signal $b$ is high during brake release and low at brake apply. Thus, during brake release, the output $w$ is always low. When, however, during brake apply, the Zener diode 198 senses a transient acceleration in excess of 2g's, the input $u$ is high and the signal $v$ will be low so that the signal $w$ will be high. The signal $w$ is connected to the resistor 120 in the threshold logic circuit 24 to increase the threshold bias by 1.5g's. Thus the system is made less sensitive to wheel hop signals. When, however, there are no such large wheel hop signals on line 20, the input $u$ of NOR gate 200 will be low and the output $w$ will likewise be low so that the threshold bias is not effected by the wheel hop suppression circuit.

Coefficient Select Circuit

On road surfaces where the friction coefficient exceeds 0.3, wheel acceleration during wheel speed recovery will always exceed 4g. On ice covered surfaces, the peak wheel acceleration will always be less than 4g. On surfaces where the friction coefficient falls between 0.15 and 0.3, the occurrence of peak wheel accelerations greater or less than 4g will depend on the specifics of the friction slip relationships. When peak wheel acceleration does not reach a 4g level, it indicates either the peak tire torque value is only slightly greater than or equal to the locked wheel tire torque or that the friction slip curve slope following the peak has a small negative value. Either of these situations degrades extremal stability and could cause premature wheel lock-up. System extremal stability can be increased by decreasing the deceleration threshold bias to the relative velocity integrator 26. The effect of the coefficient select circuit 66 is to alter the threshold bias in accordance with the coefficient of friction between the tire and road as reflected in the acceleration signal during wheel speed recovery. The circuit includes an acceleration signal level detector comprising a Zener diode 204 and a diode 206 connected serially to the line 20. These elements in combination conduct at a signal level of 4g's to provide a signal $r$ to one input of a NOR gate 208. That gate, along with NOR gate 210, provides a flip-flop circuit such that the output $s$ of the gate 208 serves as an input to the gate 210 and the output $t$ of gate 210 is an input for the gate 208. The other input signal $b'$ to gate 210 is developed by a capacitor 212 connected from the line 68 carrying signal $b$ from the hysteresis switch. The input line $b'$ is connected to ground through a resistor 214. The output $s$ of the flip-flop forms one input to a NOR gate 216 and the signal $b$ serves as the other input. The output $y$ of the gate 216 is connected via line 67 to the resistor 122 in the threshold logic circuit 24.

During the brake release phase, $b$ is high and the output $y$ is always low. When the signal $b$ first goes high, at release, the signal is differentiated by the capacitor 212 so that the signal $b'$ goes high momentarily to set the flip-flop. That is, when $b'$ goes high, $t$ will go low and since $r$ is always low, at the time of brake release, $s$ will go high. During the brake release phase, if the road coefficient is low, the wheel acceleration will not exceed 4g's and the signal $r$ will remain low so that the signal $y$ will remain low and will therefore not contribute to the threshold bias during the subsequent anti-lock cycle. If, on the other hand, the coefficient is high, the input $r$ will go high sometime during the wheel recovery phase so that $s$ will go low to reset the flip-flop. That is, $t$ will go high and $s$ will be held low. Then, during the apply phase of the subsequent cycle, when the signal $b$ goes low, the signal $y$ will go high to increase the threshold bias an amount equivalent to 1g. The signal $y$ will remain high until brake release whereupon signal $b$ goes high to turn $y$ low and $b'$ will go high momentarily to set the flip-flop and return the signal $s$ to a high level. A diode 218 connected to an input of the NOR gate 208 carries a signal $q$. As will be seen, when the vehicle brakes are off, the signal $q$ will be high to reset the flip-flop to send the signal $y$ high as long as the brakes are off and during the apply phase of the initial anti-lock cycle.

Circuit Reset

The circuit reset 64 comprises a NOR gate 220 having one input grounded and the other input connected through voltage dividing resistors 221 and 223 to ground and to conductor 225 carrying the brake light signal. The output $q$ of the NOR gate 220 is connected to the diode 218 as previously described and also via line 65 to the resistor 124 in the threshold logic circuit 24. The resistor 124 is selected to provide a 10g threshold bias current when $q$ is high. When the vehicle brakes are off and the vehicle brake lights are not illuminated, the inputs to the NOR gate 220 are low and the output $q$ is high so that the 10g threshold bias is applied. As mentioned above, when the signal $q$ is high, the signal $y$ is also high to turn on its corresponding 1g threshold bias. These biases added to the constant 1g bias from resistor 126 provide a total threshold bias of 12g's which effectively desensitizes the relative velocity integrator 26 so that extraneous wheel deceleration signals will not activate the hysteresis switch. When, however, the brakes are first applied and the brake lights are illuminated, the conductor 225 is energized to provide a high signal to an input of the NOR gate 220 which turns the signal $q$ low and removes the 10g threshold bias. Then the threshold bias is set at 2g's in readiness for the initial anti-lock cycle.

System Operation

Figure 3:
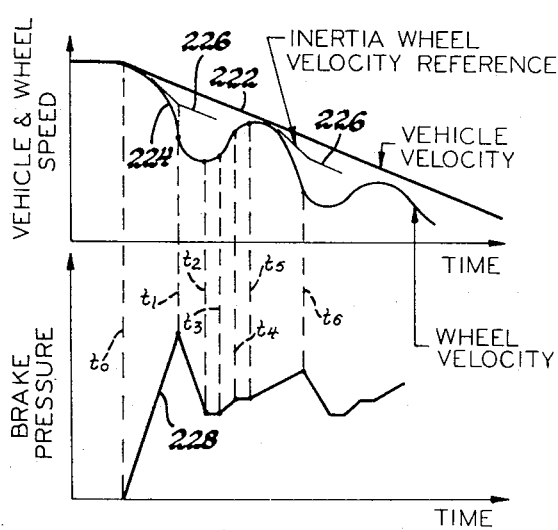
FIG. 3 is a graphical representation of vehicle speed, wheel speed and brake pressure to illustrate the operation of the control system according to the invention as applied to a high coefficient surface; and, FIG. 4 is a graphical representation of vehicle speed and wheel speed to illustrate the operation of the control system as applied to a low coefficient surface.
Figure 4:
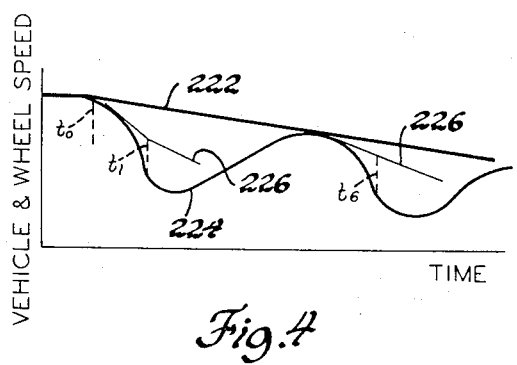

The overall operation of the system is best understood by reference to FIGS. 3 and 4. FIG. 3 is a graph showing vehicle speed on line 222, wheel speed on line 224, reference signal on line 226 and the brake pressure on line 228. The graph illustrates typical anti-lock operation on a high coefficient road surface. The reference signal 226 is an imaginary signal not actually existing in the control circuit, however, its slope represents the threshold bias signal. The graph assumes initially no brake pressure is applied and the vehicle speed and wheel speed are constant. At time $t_0$ brake pressure is first applied and the vehicle and wheel speeds decrease. The reference signal 226 initially has a slope of 2g's as described above. The relative velocity integrator 26 provides an output on line 28 which is proportional to velocity error or the vertical distance between the curves 224 and 226. When, at time $t_1$, this distance equals 4 ft. per second, the hysteresis switch 30 is actuated to switch the signal $d$ low to effect brake release, whereupon the brake pressure begins to fall. At the same time, the signal $b$ goes high to turn off the signal $y$ to reduce the threshold bias thereby changing the reference signal 226 to a slope of 1g. At time $t_2$, the wheel has accelerated to 0.5g's and this acceleration is sensed by diode 172 in the wheel speed recovery circuit to raise the signal $h$ to a high level causing output $j$ to oscillate holding the brake pressure constant until time $t_3$. Then the wheel acceleration reaches 2g's whereupon the signal level detector 188 conducts and causes the output $j$ to remain high to effect brake reapplication. At time $t_4$, the wheel acceleration has decreased to a value below 2g's whereupon the output $j$ again oscillates to hold the brake pressure at a constant value until time $t_5$ when the wheel acceleration has dropped below a 0.5g's level and the wheel is considered to have recovered in speed. Prior to that time, the output of the integrator 26 has decreased to one-half ft. per second and the signal $a$ has gone low. When the signal $h$ goes low at time $t_5$, the signal $d$ goes high to cause brake reapplication. Then brake pressure continues to increase at a controlled rate until time $t_6$ in the subsequent anti-lock cycle when the relative velocity error again signifies incipient wheel lock-up and the brake pressure is again released. Then the cycles repeat until the vehicle is brought to a stop or the brake pressure is manually released.

During wheel recovery, the wheel acceleration exceeded 4g's signifying a high coefficient surface. This acceleration is sensed by the coefficient select circuit and the 2g threshold is applied during the apply phase of the next cycle so that the reference signal 226 is like that of the first cycle. This is contrasted to FIG. 4 of the drawing which illustrates the operation of an anti-lock brake control on an icy surface. The lines 222, 224 and 226 represent the same parameters as in FIG. 3. The brake pressure is not shown in FIG. 4 since it is generally similar to that of FIG. 3. As before, in the initial cycle, the imaginary reference signal 226 has a 2g slope until time $t_1$ when the brakes are released and then the slope changes to 1g. However, during wheel recovery, the wheel acceleration does not exceed 4g's so that the coefficient select circuit 66 is not reset and the signal y remains low. Consequently, for the subsequent cycle, the slope of reference signal 226 remains at 1g resulting in a more sensitive detection of incipient wheel lock-up so that brake release at time $t_6$ occurs earlier than if the slope were at 2g's. The system extremal stability is therefore increased.

The embodiment of the invention described herein is for purposes of illustration and the scope of the invention is intended to be limited only by the following claims.

It is claimed:

1. An anti-lock brake control system for a wheeled vehicle adapted to the coefficient of friction between a braked wheel and the surface on which the vehicle is supported, comprising
    means for generating a first electrical signal proportional to acceleration of a braked wheel,
    means for producing a deceleration reference electrical signal which represents optimum wheel deceleration for vehicle braking on a given surface,
    means responsive to the reference signal and the first signal for cyclically producing a brake control signal when said first and reference signals attain predetermined relationships,
    brake pressure modulating means responsive to the brake control signal for cyclically relieving and applying brake pressure, whereby the brake pressure modulating means relieves brake pressure to permit wheel speed recovery and thereafter reapplies brake pressure,
    and means responsive to positive wheel acceleration in each cycle for altering the reference signal value for the subsequent cycle according to the value of the positive wheel acceleration during wheel speed recovery, so that the control system is conditioned to the value of wheel acceleration and hence to the coefficient of friction between the wheel and the surface.

2. An anti-lock brake control system for a wheeled vehicle comprising
    means for generating a first electrical signal proportional to wheel acceleration,
    means for producing a deceleration reference electrical signal which represents optimum wheel deceleration for vehicle braking on a high coefficient of friction surface,
    means responsive to the reference signal and the first signal for cyclically producing a brake control signal when said first and reference signals attain predetermined relationships,
    brake pressure modulating means responsive to the brake control signal for cyclically relieving and applying brake pressure, whereby the brake pressure modulating means relieves brake pressure to permit wheel speed recovery and thereafter reapplies brake pressure,
    and means responsive to positive wheel acceleration in each cycle for altering the reference signal for the subsequent cycle to a lower value when the positive wheel acceleration remains below a predetermined value during wheel speed recovery, so that the control system is conditioned to the value of wheel acceleration and hence to the coefficient of friction between the wheel and the surface.

3. An anti-lock brake control system for a wheeled vehicle comprising
    means for generating a first electrical signal proportional to wheel acceleration,
    means for producing a deceleration reference electrical signal which during initial brake application has a first value representing optimum wheel deceleration for vehicle braking on a high coefficient of friction surface,
    means responsive to the reference signal and the first signal for cyclically producing a brake control signal when said first and reference signals attain predetermined relationships,
    brake pressure modulating means responsive to the brake control signal for cyclically relieving and applying brake pressure, whereby the brake pressure modulating means relieves brake pressure to permit wheel speed recovery and thereafter reapplies brake pressure,
    means responsive to the brake control signal for changing the reference signal to a second value lower than the first value when brake pressure relief is requested,
    and means responsive to positive wheel acceleration in each cycle for maintaining the reference signal for the subsequent cycle at the second value when the positive wheel acceleration remains below a predetermined value during wheel speed recovery, and for changing the reference signal for the subsequent cycle back to the first value when the positive wheel acceleration exceeds the predetermined value during wheel speed recovery, so that the control system is conditioned to the value of wheel acceleration and hence to the coefficient of friction between the wheel and the surface.

4. An anti-lock brake control system for a wheeled vehicle comprising
    means for generating first and second electrical signals proportional to wheel acceleration,
    means including a logic circuit for producing a deceleration reference electrical signal which during initial brake application has a first value representing optimum wheel deceleration for vehicle braking on a high coefficient of friction surface, the logic circuit contributing a portion of the reference signal,
    means responsive to the reference signal and the first signal for cyclically producing a brake control signal when said first and reference signals attain predetermined relationships,
    brake pressure modulating means responsive to the brake control signal for cyclically relieving and applying brake pressure, whereby the brake pressure modulating means relieves brake pressure to permit wheel speed recovery and thereafter reapplies brake pressure, the logic circuit including means responsive to the brake control signal for disabling the logic circuit output to change the reference signal to a second value lower than the first value when brake pressure relief is requested, and means including a signal level detector responsive to the second signal in each cycle and connected to the logic circuit for disabling the logic circuit output to maintain the reference signal for the subsequent cycle at the second value when the positive wheel acceleration remains below a predetermined value during wheel speed recovery, and for enabling the logic circuit to change the reference signal for the subsequent cycle back to the first value when the positive wheel acceleration exceeds the predetermined value during wheel speed recovery, so that the control system is conditioned to the value of wheel acceleration and hence to the coefficient of friction between the wheel and the surface.

5. An anti-lock brake control system for a wheeled vehicle comprising means for generating a first electrical signal proportional to wheel acceleration, means for producing a deceleration reference electrical signal which represents optimum wheel deceleration for vehicle braking on a high coefficient of friction surface, means responsive to the reference signal and the first signal for cyclically producing a brake control signal when said first and reference signals attain predetermined relationships, brake pressure modulating means responsive to the brake control signal for cyclically relieving and applying brake pressure, whereby the brake pressure modulating means relieves brake pressure to permit wheel speed recovery and thereafter reapplies brake pressure, means responsive to positive wheel acceleration in each cycle for altering the reference signal value for the subsequent cycle according to the value of the positive wheel acceleration during wheel speed recovery, so that the control system is conditioned to the value of wheel acceleration and hence to the coefficient of friction between the wheel and the surface, means responsive to wheel acceleration for sensing transient wheel hop signals and for increasing the deceleration reference signal to render the brake control signal means less sensitive to the wheel hop signals.

6. An anti-lock brake control system for a wheeled vehicle comprising means for generating a first electrical signal proportional to wheel acceleration, means for producing a deceleration reference electrical signal which represents optimum wheel deceleration for vehicle braking on a high coefficient of friction surface, means responsive to the reference signal and the first signal for cyclically producing a brake control signal when said first and reference signals attain predetermined relationships, brake pressure modulating means responsive to the brake control signal for cyclically relieving and applying brake pressure, whereby the brake pressure modulating means relieves brake pressure to permit wheel speed recovery and thereafter reapplies brake pressure, means responsive to the wheel acceleration in each cycle for altering the reference signal value for the subsequent cycle according to the value of the positive wheel acceleration during wheel speed recovery, so that the control system is conditioned to the value of wheel acceleration and hence to the coefficient of friction between the wheel and the surface, and means responsive to wheel acceleration including a bandpass filter for passing transient wheel hop signals, and a signal level detector responsive to wheel hop signals of a predetermined minimum amplitude for increasing the deceleration reference signal to render the brake control signal means less sensitive to the wheel hop signal.

* * * * *